United States Patent [19]

Graf et al.

[11] Patent Number: 5,452,627

[45] Date of Patent: Sep. 26, 1995

[54] MAKING A COMPOSITE PROFILED WIRE

[75] Inventors: Ralph Graf, Freienbach, Switzerland; Hank O. Heuvel, Enschede, Netherlands

[73] Assignee: Graf + Cie AG Kratzen- und Maschinenfabrik, Rapperswil, Switzerland

[21] Appl. No.: 227,543

[22] Filed: Apr. 14, 1994

[30] Foreign Application Priority Data

Apr. 14, 1993 [DE] Germany .................. 43 12 122.5

[51] Int. Cl.$^6$ .................................................. D01B 3/10
[52] U.S. Cl. .................................................. 76/101; 228/158
[58] Field of Search .......................... 228/158; 76/112.1, 76/101

[56] References Cited

U.S. PATENT DOCUMENTS

| | | | |
|---|---|---|---|
| 3,387,338 | 6/1968 | Kanai et al. | 76/112 X |
| 3,593,600 | 7/1971 | Adams et al. | 76/112 |
| 3,737,979 | 6/1973 | Rakich et al. | 228/158 |
| 3,835,526 | 9/1974 | Bartlo et al. | 228/158 |
| 4,476,194 | 10/1984 | Sanborn et al. | 228/158 X |
| 5,215,245 | 6/1993 | Moyer | 228/152 |

*Primary Examiner*—Kenneth J. Ramsey
*Attorney, Agent, or Firm*—Herbert Dubno; Andrew Wilford

[57] ABSTRACT

A profiled wire such as a toothed card roll wire, is made by first fitting together at least two longitudinally extending starting wires each of a predetermined cross-sectional size and each having a longitudinally extending surface region by engaging the regions together transversely and thereby forming a longitudinally extending interface. The fitted-together wires are then bonded together at the interface and the joined wires are subsequently profile pressed, that is deformed by rolling or drawing, while maintaining constant the relationship between the cross-sectional sizes perpendicular to the longitudinal direction of the starting wires. A toothed wire for a card roll can be made by further forming one of the profiled sections as a root section to be seated into a groove of the card roll and the other section as a blade with card teeth therein and hardening the formed blade section.

20 Claims, 2 Drawing Sheets

MAKING A COMPOSITE PROFILED WIRE

SPECIFICATION

1. Field of the Invention

The present invention relates to the manufacture of profiled wire.

2. Background of the Invention

In the known state of the art profile wires are normally made by profile rolling a starting wire of generally circular section into the desired shape or the desired profile. Thus the end profile is produced by deformation of the starting wire with a one-piece starting section by a plurality of deformation steps.

It has been suggested to form a composite wire from two starting wires of different compositions that are given the desired profiles and then joined together. Such a procedure invariably produces a finished product that is arced severely, that is which is curved dramatically to one side. This shape makes the wire useless. Attempts at straightening it produce crimps along one edge, making the wire unacceptable. Similarly such a wire frequently has a rough longitudinal seam at the joint where the two dissimilar wires are joined, making it unusable for some purposes.

OBJECTS OF THE INVENTION

It is therefore an object of the present invention to provide an improved method of making a profiled wire.

Another object is the provision of such an improved method of making a profiled wire which overcomes the above-given disadvantages, that is which allows two dissimilar wires to be joined together and shaped into a complex profile while still remaining straight.

SUMMARY OF THE INVENTION

A profiled wire is made according to the invention by first fitting together at least two longitudinally extending starting wires each of a predetermined cross-sectional size and each having a longitudinally extending surface region by engaging the regions together transversely and thereby forming a longitudinally extending interface. The fitted-together wires are then bonded together at the interface and the joined wires are subsequently profile pressed, that is deformed by rolling or drawing, while maintaining constant the relationship between the cross-sectional sizes perpendicular to the longitudinal direction of the starting wires.

Since the cross sections of the individual wires are maintained constant there is no significant flow longitudinally of the wires during deformation and the shape of the interface does not change. Hence the finished wire, which can be used as a toothed wire set in a card roll, will be as straight as the starting wires. A further advantage of the method of the invention is that the subsequent shaping process almost automatically eliminates the roughnesses produced along the joining interface produced during formation of the joint between the wires. In addition with such a process the interface along which the wires are joined can be positioned so that the starting wires can be easily joined to each other while the joining regions in the pressed profile are no longer accessible during production.

According to this invention the starting wires are of different materials, for instance one of the starting wires is of alloyed steel and the other is of unalloyed steel. The unalloyed steel can be C-10 steel.

Furthermore in accordance with this invention, prior to fitting together the two starting wires, at least one of the starting wires is profiled to flatten the respective surface. More particularly, both of the wires are of standard circular section to start with and are profiled to a polygonal section before being fitted together.

The starting wires are bonded together by welding, in particular by electron-beam welding in a high vacuum without the use of additives. This makes a very clean bond that resists separation during the subsequent deformation operations. Furthermore, the subsequent rolling and/or drawing eliminates any rough spots created by the weld seam.

Furthermore according to the invention, after bonding together the wires and before profile-pressing them, the bonded-together wires are annealed to relieve internal stresses.

The profile pressing according to this invention can be done by hot- or cold-rolling or -drawing. After each of the profile-pressing steps, since the end profile cannot normally be formed in one step, the wires are annealed.

When the all-steel fitting wire of this invention is used, for instance, as a tooth wire in a card roll the foot part that is seated in a groove in the card roll can be made of relatively flexible and/or malleable steel. The blade part that projects from the roll can have hardened wear-resistant teeth.

BRIEF DESCRIPTION OF THE DRAWING

The above and other objects, features, and advantages will become more readily apparent from the following description, reference being made to the accompanying drawing in which.

SPECIFIC DESCRIPTION

Figure 1A:
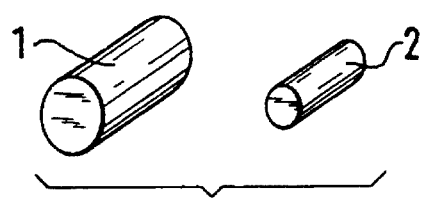
FIGS. 1a through 1d show the steps of the method of this invention.
Figure 1B:
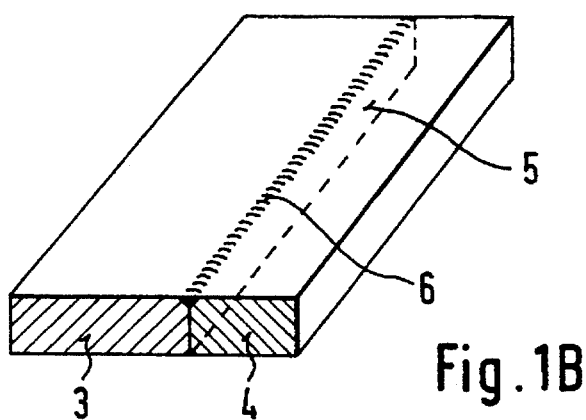

As seen in FIGS. 1A and 1B a pair of round-section wires 1 and 2, the former of unalloyed C-10 steel and the latter of high-alloy and wear resistant CrMo steel, are initially rolled to form wires 3 and 4 of rectangular section and the same vertical thickness. These two rectangular-section wires 3 and 4 are fitted together and then joined by a weld 6 along a planar interface 5 that extends longitudinally of the wires 3 and 4. The weld 6 is made by an electron-beam welder under high vacuum with no additives so the two wires 3 and 4 are joined at the molecular level.

Figure 1C:
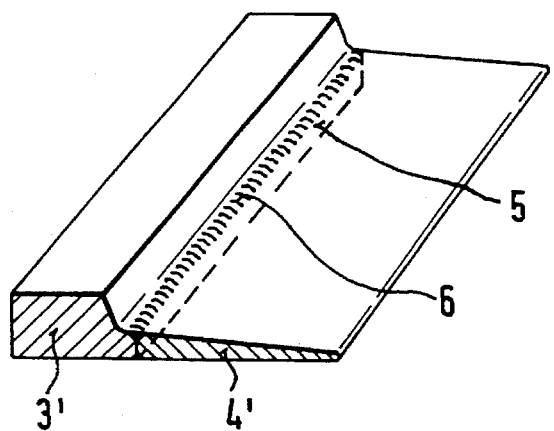
Figure 1D:
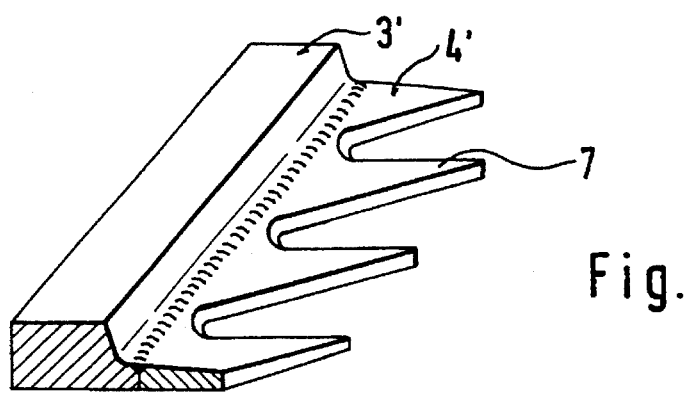

Subsequently as seen in FIG. 1C the joined wires are profile pressed in several cold-rolling steps to deform the wires 3 and 4 into the sections shown at 3' and 4'. To this end each individual cold-rolling step is stopped before reaching the maximum deformability of the individual starting wires. Tensions or hardness differences produced during the cold rolling are eliminated after each cold-rolling step by annealing. The cold rolling is carried out such that the relationship of the cross-sectional areas of the wires 3' and 4' remains the same. As a result the interface 5 along which the starting wires are joined together is not deformed perpendicular to the longitudinal direction. In particular this means that the weld seam 6 extends straight in the longitudinal direction and the profile wire has no bend in the longitudinal direction.

The profile wire shown in FIG. 1C can serve as a starting product for an all-steel fitting. The portion 3' formed of unalloyed C-10 steel thus serves as the foot part of the fitting and the portion 4' formed of high-alloy CrMo steel serves as the blade part. To finish, fitting teeth 7 are stamped into the blade part 4' which is subsequently heated to about 1200° C. and quenched to harden it. The teeth 7 are tempered after hardening in order to improve their hardness. Since the profile wire is formed of two welded-together parts, it is not hardened through.

As described above the method according to the invention produces an all-steel fitting whose foot part has good flexibility and whose blade part has good wear resistance without limitation of the selection of starting materials.

Figure 2:
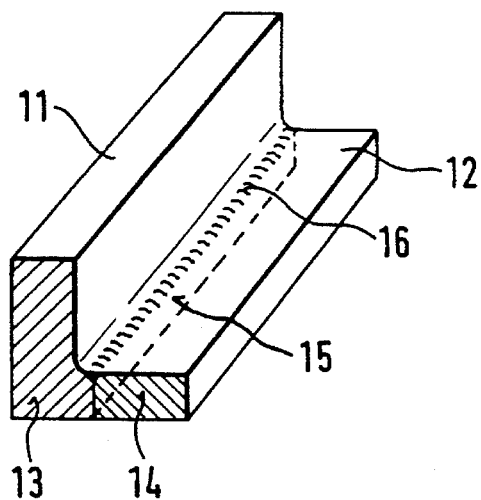
FIGS. 2a through 2c correspond respectively to FIGS. 1b through 1d and show another system according to the invention.
Figure 2:
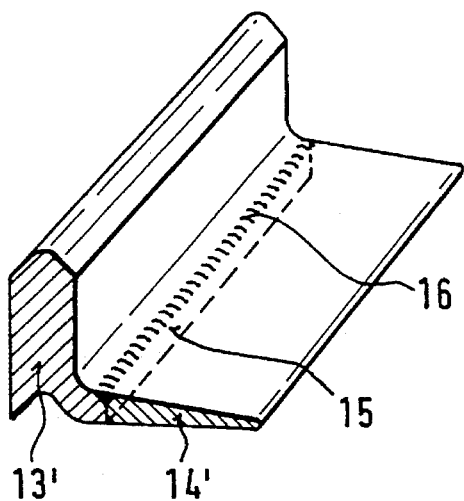
Figure 2:
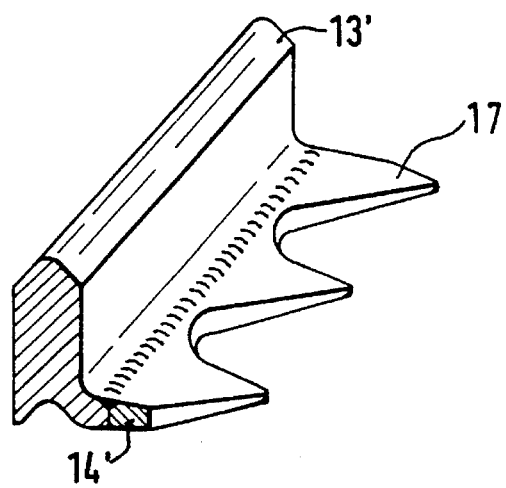

The method for producing an all-steel fitting according to FIG. 2A through 2C is only different from the method described with reference to FIGS. 1A through 1D in that on joining of the once again generally rectangular-section starting wires 11 and 12 the narrow side of the wire 12 is laid on the wide side of the wire 11 and the joining region 15 only extends over a portion of the wide side of the wire 11. The profile pressing is again carried out so that the relationships of the cross-sectional areas of the deformed wires 13' and 14' remain constant relative to each other. As a result the weld seam 16 extends also in the intermediate product shown in FIG. 2B straight in the longitudinal direction and the joining region 15 has no longitudinal deformations.

The method shown with reference to FIGS. 2A through C makes particularly clear that by careful selection of shape and the right selection of join regions of the starting wires the deformation of the joined wires by the profile press can be small.

The method according to the invention is not limited to the embodiments described with reference to the drawing. For example other materials can be used for the starting wires, more than two starting wires can be joined, or other methods can be used to produce the joint between the wires, for example brazing, induction welding, or cold welding. The material for the starting wires can be in particular ceramics. It is also possible to produce products other than all-steel fitting with the method of the invention, e.g. cap hardware, that is products where it is necessary to make the most stressed parts of particularly wear-resistant materials.

We claim:

1. A method of making a profiled wire comprising the steps of sequentially:

fitting together at least two longitudinally extending starting wires each of a predetermined cross-sectional size and each having a longitudinally extending surface region by engaging the regions together transversely and thereby forming a longitudinally extending interface;

bonding the fitted-together wires together at the interface;

profile-pressing the joined wires while maintaining constant the relationship between the cross-sectional sizes perpendicular to the longitudinal direction of the starting wires.

2. The wire-making method defined in claim 1 wherein the starting wires are of different materials.

3. The wire-making method defined in claim 2 wherein one of the starting wires is of alloyed steel and the other is of unalloyed steel.

4. The wire-making method defined in claim 3 wherein the unalloyed steel is C10 steel.

5. The wire-making method defined in claim 1 further comprising the step, prior to fitting together the two starting wires, of profiling at least one of the starting wires to flatten the respective surface.

6. The wire-making method defined in claim 5 wherein both of the wires are profiled to a polygonal section before being fitted together.

7. The wire-making method defined in claim 1 wherein the wires are bonded together by welding.

8. The wire-making method defined in claim 7 wherein the bonding is done by electron-beam welding in a high vacuum without the use of additives.

9. The wire-making method defined in claim 1, further comprising the step after bonding together the wires and before profile-pressing them of annealing the bonded-together wires.

10. The wire-making method defined in claim 1 wherein the profile pressing is done by rolling.

11. The wire-making method defined in claim 10 wherein the profile pressing is done by cold rolling.

12. The wire-making method defined in claim 1 wherein the profile pressing is done by drawing.

13. The wire-making method defined in claim 1, further comprising the step after profile pressing of annealing the joined profile-pressed wires.

14. The wire-making method defined in claim 1 wherein one of the wires is profile-pressed into a thin blade while the other wire is left as a thick foot part.

15. The wire-making method defined in claim 14 wherein the one wire forming the blade is of alloyed steel and the other wire is of unalloyed steel.

16. The wire-making method defined in claim 14, further comprising the step after profile-pressing of forming teeth in the blade.

17. The wire-making method defined in claim 16, further comprising the step after forming the teeth of hardening the teeth.

18. The wire-making method defined in claim 17 wherein the teeth are hardened by tempering.

19. The wire-making method defined in claim 1 wherein the interface is generally planar and the profile pressing is effected to leave the interface generally planar.

20. The wire-making method defined in claim 1 wherein the profile pressing is done with substantially no longitudinal flow of the material of the wires.

* * * * *